Aug. 24, 1943.   E. E. SIMMONS, JR   2,327,935
EXPLOSION PRESSURE GAUGE
Original Filed Feb. 23, 1940
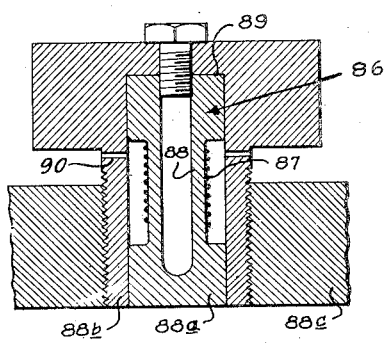
INVENTOR
Edward E. Simmons, Jr.
BY
ATTORNEY Patented Aug. 24, 1943

2,327,935

UNITED STATES PATENT OFFICE 2,327,935

EXPLOSION PRESSURE GAUGE

Edward E. Simmons, Jr., Pasadena, Calif.

Original application February 23, 1940, Serial No. 320,327, now Patent No. 2,292,549, dated August 11, 1942. Divided and this application January 1, 1942, Serial No. 425,357

4 Claims. (Cl. 201—63)

This invention relates generally to fluid pressure measuring apparatus and more particularly to apparatus for measuring explosive gaseous forces such as in internal combustion engine cylinders.

A great many devices have heretofore been proposed and used for measuring sudden gaseous explosive forces one common form of which is in internal combustion engines but these devices, such as engine cylinder pressure indicators, have been deficient in either their structural, functional or economic aspects. The problem of providing a simple and relatively economical, sensitive and accurate engine pressure indicator has been particularly difficult when it is attempted to accurately determine the true pressure conditions which may arise with great suddenness. Some of these devices have employed mechanical, optical and electrical means as well as other possible arrangements but they have been either expensive or too delicate or not delicate enough or have not been sufficiently rugged for ordinary usage.

It is an object of my invention to provide an improved apparatus for measuring fluid pressure forces with a high degree of accuracy, sensitivity and dependability combined with simplicity, economy of construction, operation and maintenance, as well as being rugged.

A further object of my invention is to provide an improved fluid pressure measuring apparatus sufficiently compact and simple so that it may be easily inserted within a relatively small opening in the wall of a chamber in which a sudden fluid pressure may be measured.

Other objects and advantages will be more apparent to those skilled in the art from the following description of the accompanying drawing which is a sectional view through my improved apparatus.

Some present high speed engine indicator gauges use a piezo-electric strain sensitive system but are objectional because of leakage of electrical charge and therefore not applicable to slowly changing or static pressure measurement. A second objection is their temperature limitation. My improved apparatus employs a strain sensitive filament which, when applied to a piston-like pressure element described below, is free of the first objection stated above and secondly is capable of withstanding much higher temperatures than piezo-electric gauges. In my apparatus the strain sensitive filament 87 is attached to a dynamometer stud 86, preferably hollow, provided with an enlarged head solidly seated or fixed at one end 88 in a cylinder member 88b and is integrally connected to a piston 88a at its other end. Thus the dynamometer stud is formed by a reduced portion or neck 86 in an otherwise cylindrically straight member. The whole piston-stud assembly is contained in the bore of a tightly fitting cylinder 88b which is preferably threadedly attached to an engine cylinder or other vessel 88c. This present type of gauge can be arranged so as not to disturb the original volume of the engine cylinder or other pressure vessel and it may be easily precalibrated. For high temperature applications, a thin coating of quartz is evaporated on the surface of the dynamometer stud 86 to serve as an insulating medium between the wire and the stud. A high temperature cement or fusible glass is used to attach the filament throughout its effective length to the dynamometer stud 86, the filament being wound around the dynamometer stud and connected as one arm of a Wheatstone bridge for measuring changes in resistance in the filament in response to compressive strains created therein by the expansion of stud 86 when a fluid pressure force impinges upon piston 88a, the piston being axially movable in cylinder 88b to permit said compressible strain. Parts 90 prevent accumulation of pressure behind head 88a. The Wheatstone bridge for measuring changes in resistance of the filament is well-known and is more fully described in my copending application Serial No. 320,327, filed February 23, 1940 now Patent No. 2,292,549, issued April 11, 1942, of which the present application is a division.

As disclosed in said parent application, the filament consists of a very fine metallic wire continuously solid throughout its length and whose electrical strain characteristics are predetermined. This wire may be of suitable and well-known material such as "constantan," "advance" and various other well-known materials having good resistance properties as well as being capable of fabrication in small wire sizes. I have employed filaments approximately 0.001 to 0.003 of an inch in diameter. The strain filament employs the well-known principle that the electrical resistance of materials varies with the strain thereof, herein referred to as "electrical strain sensitivity." The filament is bonded throughout its effective length to the surface subject to strain by suitable bonding and electrical insulating material such as "glyptal," although in the specific embodiment of my engine indicator where high temperature may be encountered I employ, as above described, a high temperature fusible glass to attach to the filament to the dynamometer.

From the foregoing disclosure, it is seen that I have provided a pressure indicator that is simple, compact and relatively inexpensive in construction, operation and maintenance, and yet has a high degree of sensitivity, accuracy and responsiveness thereby producing a very effective pressure indicating device that is especially applicable for measuring sudden explosive forces.

It will of course be understood that various changes in details of construction and arrangement of parts may be made by those skilled in the art without departing from the spirit of the invention as set forth in the appended claims.

I claim:

1. A pressure responsive apparatus comprising, in combination, a member having a bore subject to fluid pressure at one end, a dynamometer stud disposed in said bore and having a front end and a rear end, said rear end of the stud being held against movement in said bore while said front end of the stud has a sliding fit in said bore and is adapted to have axial movement in response to a fluid pressure force applied thereto from the end of the bore subject to pressure, said stud having a peripheral portion subject to strain in response to said axial movement, and a continuous solid filament of electrical conducting material bonded throughout its effective length to said peripheral portion of the dynamometer stud and whose electrical resistance varies with its strain whereby the resistance of said filament is responsive to strains in said stud arising from the fluid pressure force applied to the free end thereof.

2. The combination set forth in claim 1 further characterized in that said stud has an enlarged head axially movable within said bore and said head constituting the front pressure end of the stud while said peripheral portion is located rearwardly of said enlarged head.

3. The combination set forth in claim 1 further characterized in that said stud has an enlarged head axially movable within said bore and being substantially flush with the end thereof whereby said head constitutes the fluid pressure end of the stud while said peripheral portion is located rearwardly of said enlarged head.

4. A pressure responsive apparatus comprising, in combination, a member insertable in an opening formed in the wall of a pressure vessel, said member having a bore open at its inner end adjacent said wall and closed at its outer end, a dynamometer stud having a reduced intermediate portion thereby forming enlarged ends on the stud one of which is seated in the closed end of said bore and the other of which is slidably disposed in said bore near the inner end thereof so as to be exposed to pressure within the pressure vessel, and a continuous solid filament of electrical conducting material bonded throughout its effective length on the surface of said reduced portion and whose electrical resistance varies with its strain whereby the resistance of said filament is responsive to strains in said stud created by fluid pressure forces on the exposed enlarged end of said dynamometer.

EDWARD E. SIMMONS, Jr.